US009831692B2

(12) United States Patent
Kim

(10) Patent No.: US 9,831,692 B2
(45) Date of Patent: Nov. 28, 2017

(54) RECHARGEABLE BATTERY CHARGING APPARATUS

(71) Applicant: SAMSUNG SDI CO., LTD., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 83 days.

(21) Appl. No.: 14/937,783

(22) Filed: Nov. 10, 2015

(65) Prior Publication Data

US 2016/0141897 A1    May 19, 2016

(30) Foreign Application Priority Data

Nov. 14, 2014 (KR) .................. 10-2014-0159162

(51) Int. Cl.
H02J 7/00    (2006.01)

(52) U.S. Cl.
CPC .......... *H02J 7/0026* (2013.01); *H02J 7/0021* (2013.01); *H02J 7/0042* (2013.01); *H02J 2007/0098* (2013.01); *Y02T 10/7055* (2013.01)

(58) Field of Classification Search
CPC ......... H02J 2007/0037; H02J 2007/004; H02J 7/0026; H02J 7/0042; H02J 7/0091
USPC ....................................................... 320/112
See application file for complete search history.

(56) References Cited

U.S. PATENT DOCUMENTS 3,037,066 A * 5/1962 Grieger et al. ....... H01M 10/44
429/59
5,714,869 A * 2/1998 Tamechika et al. ... H02J 7/0031
320/101
6,373,790 B1 * 4/2002 Fujisawa ................. H02J 7/027
320/134
8,547,069 B2 * 10/2013 Jang ...................... B60L 3/0046
320/150
8,557,418 B2 * 10/2013 Byun et al. ......... H01M 2/0237
429/156
8,652,672 B2 * 2/2014 Whitacre et al. ... H01M 2/1077
429/99
8,852,767 B2 * 10/2014 Jang et al. ............. H01M 2/34
200/61.08

(Continued)

FOREIGN PATENT DOCUMENTS

| JP | 2012-130155 A | 7/2012 |
|---|---|---|
| KR | 10-2010-0059641 A | 6/2010 |
| KR | 10-2011-0021397 A | 3/2011 |

OTHER PUBLICATIONS

Patent Abstracts of Japan and English Machine Translation of Japanese Patent No. 2012-130155 A, Jul. 5, 2012, 18 Pages.

*Primary Examiner* — Sun Lin
(74) *Attorney, Agent, or Firm* — Lewis Roca Rothgerber Christie LLP

(57) ABSTRACT

A rechargeable battery charging apparatus includes a battery module including a plurality of battery cells, a charging unit configured to charge the battery module using power supplied from an external power source, and an overcharge preventing unit configured to deform according to an internal pressure of the battery module to electrically couple the battery module and the charging unit, wherein the charging unit is configured to stop charging the battery module when the charging unit is electrically coupled to the battery module by the overcharge preventing unit.

4 Claims, 5 Drawing Sheets

(56) References Cited

U.S. PATENT DOCUMENTS

| | | | | |
|---|---|---|---|---|
| 9,263,900 B2* | 2/2016 | Ju et al. | ................ | H02J 7/0029 |
| 9,263,908 B2* | 2/2016 | Ju et al. | .................. | H02J 7/007 |
| 2004/0247994 A1* | 12/2004 | Masuda et al. | ....... | H01M 2/345 |
| | | | | 429/66 |
| 2013/0234721 A1* | 9/2013 | Nakamura et al. | ... | H01M 2/105 |
| | | | | 324/434 |
| 2013/0295421 A1* | 11/2013 | Teramoto et al. | .... | H01M 10/48 |
| | | | | 429/61 |
| 2014/0062418 A1* | 3/2014 | Lim et al. | ............. | H02J 7/0031 |
| | | | | 320/137 |
| 2015/0137767 A1* | 5/2015 | Kim | ..................... | H02J 7/0031 |
| | | | | 320/137 |
| 2015/0171480 A1* | 6/2015 | Seo et al. | .............. | H01M 2/345 |
| | | | | 429/154 |

* cited by examiner

RECHARGEABLE BATTERY CHARGING APPARATUS

CROSS-REFERENCE TO RELATED APPLICATION

This application claims priority to and the benefit of Korean Patent Application No. 10-2014-0159162, filed in the Korean Intellectual Property Office on Nov. 14, 2014, the entire content of which is incorporated herein by reference.

BACKGROUND

1. Field

Embodiments of the present invention relate to a rechargeable battery charging apparatus.

2. Description of the Related Art

Recently, worsening environmental pollution of the earth has increased the desire to use non- or less-polluting energy sources. For example, air pollution has been increasing, and vehicle exhaust gas is one of the major sources of air pollution in big cities.

In this context, research into commercialization of hybrid vehicles using electricity, a non-polluting vehicle energy source, as a power source for electric vehicles, such as electric automobiles or fuel cell vehicles, has been actively conducted. Electric vehicles generally receive electrical energy from the outside (e.g., from an external source), charge the received electrical energy into a battery thereof, and convert the energy stored in the battery into mechanical energy with a motor coupled to wheels to obtain power.

When a rechargeable battery is over-charged, a voltage within the rechargeable battery may increase, a gas may be generated within the rechargeable battery, and an internal pressure may increase due to the generated gas, which may result in expansion and explosion of a case of the rechargeable battery. Thus, a protection device for preventing abnormal overcharge of rechargeable batteries is desired.

The above information disclosed in this Background section is only for enhancement of understanding of the background of the invention, and therefore, it may contain information that does not form the prior art that is already known to a person of ordinary skill in the art.

SUMMARY

The present invention has been made in an effort to provide a rechargeable battery charging apparatus that effectively prevents a rechargeable battery from being overcharged when the rechargeable battery is charged with power supplied from an external power source.

The present invention has also been made in an effort to provide a rechargeable battery charging apparatus that prevents a rechargeable battery from being overcharged even when a battery management system has a fault.

Technical features and aspects of the present invention are not limited to the foregoing technical features and aspects, and other technical features and aspects not mentioned will be clearly understood by a person skilled in the art from the following description.

An exemplary embodiment of the present invention provides a rechargeable battery charging apparatus including: a battery module including a plurality of unit cells; a charging unit configured to charge the battery module using power supplied from the outside; and an overcharge preventing unit configured to deform according to internal pressure of the battery module to electrically couple the battery module and the charging unit, wherein the charging unit is configured to stop the charging of the battery module when the charging unit is electrically coupled to the battery module by the overcharge preventing unit.

Each of the plurality of unit cells may include an electrode assembly including a first electrode and a second electrode, and a case accommodating the electrode assembly.

The overcharge preventing unit may include: a first short-circuit plate integrally formed with the case of at least one of the plurality of unit cells and electrically coupled to the first electrode of the at least one of the plurality of unit cells, the first short-circuit plate being configured to deform according to internal pressure of the case; and a second short-circuit plate spaced from the first short-circuit plate and electrically coupled to the charging unit, wherein the first short-circuit plate may be configured to physically contact the second short-circuit plate when the first short-circuit plate deforms.

The second short-circuit plate may be insulated from the case and may be outside of the case.

When internal pressure of the case increases, the first short-circuit plate may be deformed so as to physically contact the second short-circuit plate.

When the charging unit is electrically coupled to the battery module and an input voltage value is equal to or greater than a threshold value, the charging unit may stop the charging of the battery module.

The rechargeable battery charging apparatus may further include a battery management system configured to monitor a state of the battery module and to control charging and discharging of the battery module, wherein, when the charging unit is electrically coupled to the battery module by the overcharge preventing unit, the charging unit may stop the charging of the battery module without intervention of the battery management system.

According to at least one embodiment of the present invention, even when a rechargeable battery is overcharged, the rechargeable battery can be promptly protected.

According to at least one embodiment of the present invention, even when the battery management system malfunctions, overcharging of the rechargeable battery can be prevented.

The aspects and effects of the present invention are not limited to the aforesaid, and any other aspects and effects not described herein will be clearly understood by those skilled in the art from following descriptions.

DETAILED DESCRIPTION

Figure 1:
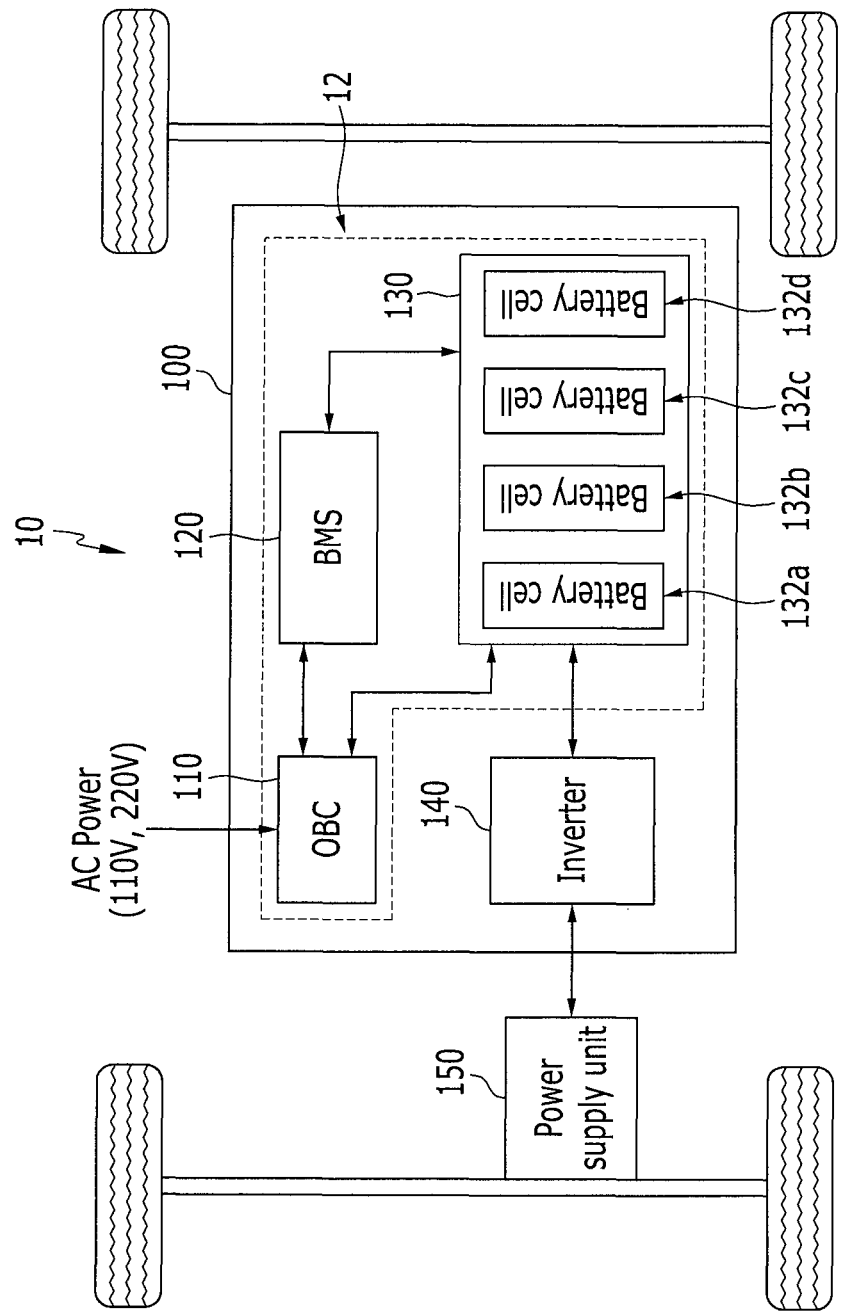
FIG. 1 is a block diagram schematically illustrating a vehicle including a rechargeable battery charging apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout the specification, unless explicitly described to the contrary, the terms "include," "including," "comprise," and "comprising," and variations, such as "includes" or "comprises," will be understood to imply the inclusion of stated elements but not the exclusion of any other elements. It will be further understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expression, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "use," "using," and "used" may be considered synonymous with the terms "utilize," "utilizing," and "utilized," respectively.

Exemplary embodiments of the present invention will hereinafter be described in detail with reference to the accompanying drawings.

FIG. 1 is a block diagram schematically illustrating a vehicle 10 including a rechargeable battery charging apparatus 12 according to an exemplary embodiment of the present invention.

As illustrated in FIG. 1, the vehicle 10 may be connected to (e.g., coupled to) an electric vehicle supply equipment (EVSE) (e.g., 110 V, 220 V, etc.) to receive power for charging a battery module 130 installed in the vehicle 10.

In this embodiment, an on-board charger (OBC) 110 of the vehicle 10 may receive a control pilot signal from the EVSE supplying external AC power and may charge the battery module 130 with power supplied from the EVSE. The control pilot signal may be a 12 V or 9 V constant voltage signal or may be a +9 V/−12 V or +6 V/−12 V pulse width modulation (PWM) signal.

In this embodiment, the EVSE may be a charging facility provided in a household or may be a charging stand provided at a vehicle charging station, such as a gas station. The EVSE, as a charging facility or stand for charging a hybrid vehicle or an electric vehicle, includes an in-cable control box (ICCB) or a charging circuit interrupt device (CCID).

A battery management system (BMS) 120 communicates with the OBC 110 and/or the battery module 130 to transmit and receive control information and may monitor a state of the battery module 130. For example, the BMS 120 may measure or calculate an open circuit voltage (OCV), a temperature, and a state of charge (SOC) of the battery module 130.

The battery module 130 may be installed in a hybrid vehicle or an electric vehicle and may supply power to a driving motor. The battery module 130 may be a single battery pack in which battery cells 132a to 132d are connected in series to achieve a desired capacity.

In this embodiment, if power consumption is excessive or a charged current is excessive, internal temperature of the battery cells 132a to 132d may sharply increase and, accordingly, a pressure within the case of the battery cells 132a to 132d may increase.

In order to ensure stability and integrity of the battery cells 132a to 132d, the battery module 130 may further include an overcharge preventing unit. The overcharge preventing unit may be provided in each of the battery cells 132a to 132d.

When abnormal behavior of the battery cells 132a to 132d occurs, the overcharge preventing unit is driven and a signal according to the abnormal behavior of the battery cells 132a to 132d may be output to the OBC 110 and/or the BMS 120.

Also, when excess pressure occurs within the battery cells 132a to 132d, the overcharge preventing unit provided in a housing of the battery cells 132a to 132d may act as a sort of emergency circuit breaker. Further, when excessive internal pressure occurs within the housing, the overcharge preventing unit may generate a short circuit to deactivate the battery cells 132a to 132d.

A motor 150 may receive power charged in the battery module 130 which has been converted by an inverter 140. The motor 150 may be driven using the supplied power.

Hereinafter, the rechargeable battery charging apparatus 12 will be described in further detail with reference to FIG. 2.

Figure 2:
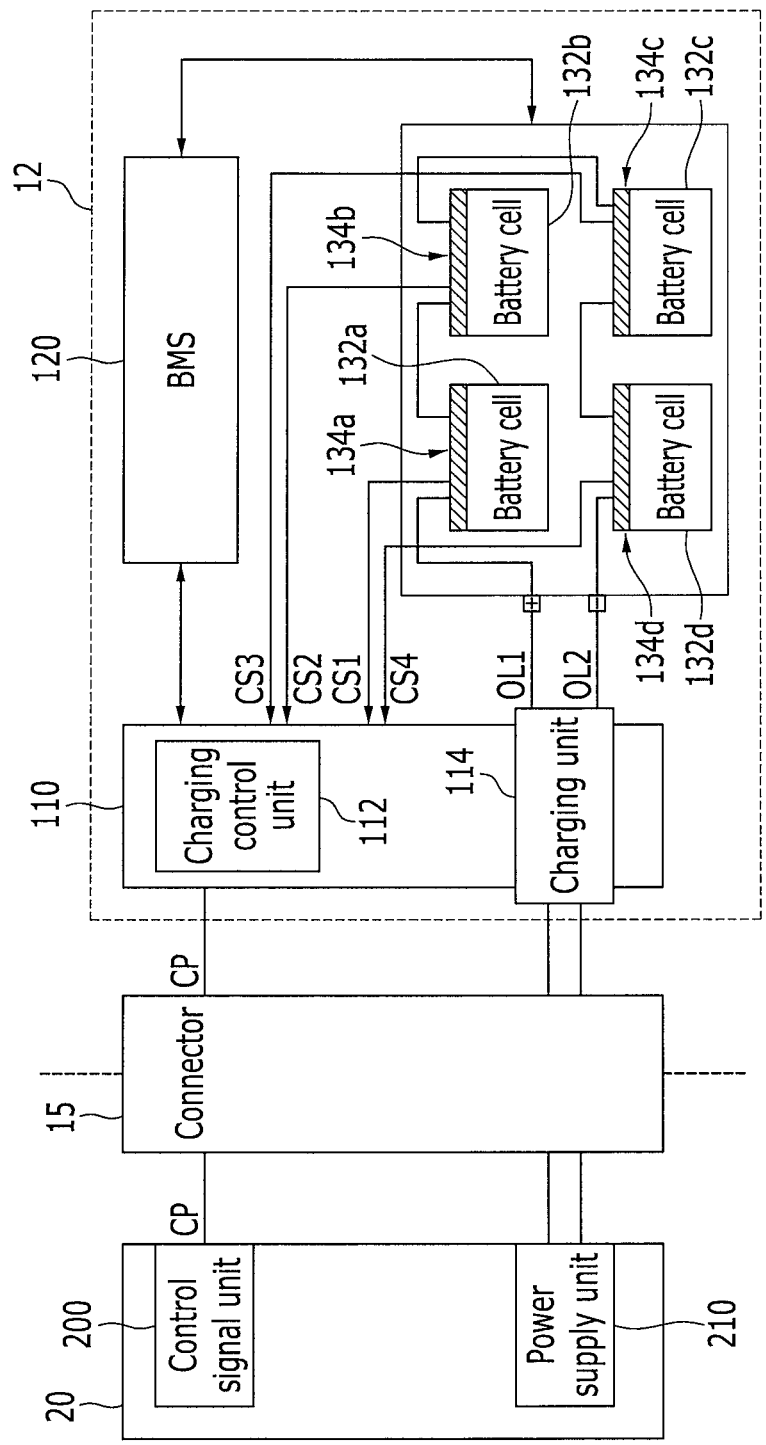
FIG. 2 is a block diagram illustrating a rechargeable battery charging apparatus and electric vehicle supply equipment (EVSE) according to an exemplary embodiment of the present invention.

FIG. 2 is a block diagram illustrating the rechargeable battery charging apparatus 12 and EVSE 20 according to an exemplary embodiment of the present invention.

As illustrated in FIG. 2, the rechargeable battery charging apparatus 12 and the EVSE 20 may be connected via a connector 15.

The rechargeable battery charging apparatus 12 may include the OBC 110, the BMS 120, and the battery module 130. The EVSE 20 may include a control signal unit 200 and a power supply unit 210.

The components illustrated in FIG. 2 are not essential, and the rechargeable battery charging apparatus 12 and the EVSE 20 may include fewer or more components.

Hereinafter, the components will be further described one by one.

The OBC 110 may include a charging control unit 112 and a charging unit 114. The OBC 110 may receive a control pilot signal CP from the control signal unit 200 of the EVSE 20 through the connector 15.

Also, the OBC 110 may receive power for charging the vehicle 10 from the power supply unit 210 of the EVSE 20 through the connector 15. Then, the charging control unit 112 may control an operation of the charging unit 114 charging the battery module 130 by using the control pilot signal CP.

The battery module 130 may include a plurality of battery cells 132a to 132d and at least one overcharge preventing unit 134a to 134d. Any one of the plurality of overcharge preventing units 134a to 134d may be provided in any one corresponding battery cell among the plurality of battery cells 132a to 132d (e.g., one overcharge prevention unit 134a to 134d may be provided to each of the plurality of battery cells 132a to 132d).

A cathode terminal of any one of the plurality of battery cells 132a to 132d may be connected to an anode terminal of a neighboring battery cell through a bus bar. A cathode terminal of the first battery cell 132a and an anode terminal of the fourth battery cell 132d may be connected to external power lines OL1 and OL2, respectively. The first to fourth battery cells 132a to 132d may be charged with a voltage (e.g., a predetermined voltage) upon receiving a charge current flowing through the external power lines OL1 and OL2.

The overcharge preventing units 134a to 134d may be electrically connected to (e.g., electrically coupled to) the OBC 110, and when the battery cells 132a to 132d are overcharged and an internal pressure thereof increases, the overcharge preventing units 134a to 134d may output abnormality signals CS1 to CS4 to the OBC 110, respectively.

When the abnormality signals CS1 to CS4 are output from the overcharge preventing units 134a to 134d, the charging control unit 112 of the OBC 110 may control the charging unit 114 to stop the charging of the battery module 130 without intervention of the BMS 120.

For example, when at least one abnormality signal is output, the charging control unit 112 generates a charging stop signal. The charging control unit 112 outputs the charging stop signal to the charging unit 114 to stop the charging of the battery module 130.

In this embodiment, the abnormality signals CS1 to CS4 may be voltage values. When the voltage values are equal to or greater than a threshold value (e.g., a predetermined threshold value), the OBC 110 may output a charging stop signal to the charging unit 114 to stop the charging of the battery module 130.

Even when an error occurs in the BMS 120, the OBC 110 may stop the charging of the battery module 130 according to the abnormality signals CS1 to CS4 output by operation of the overcharge preventing units 134a to 134d.

Hereinafter, connection relationships of the battery cells 132a to 132d and the overcharge preventing units 134a to 134d will be further described.

Figure 3:
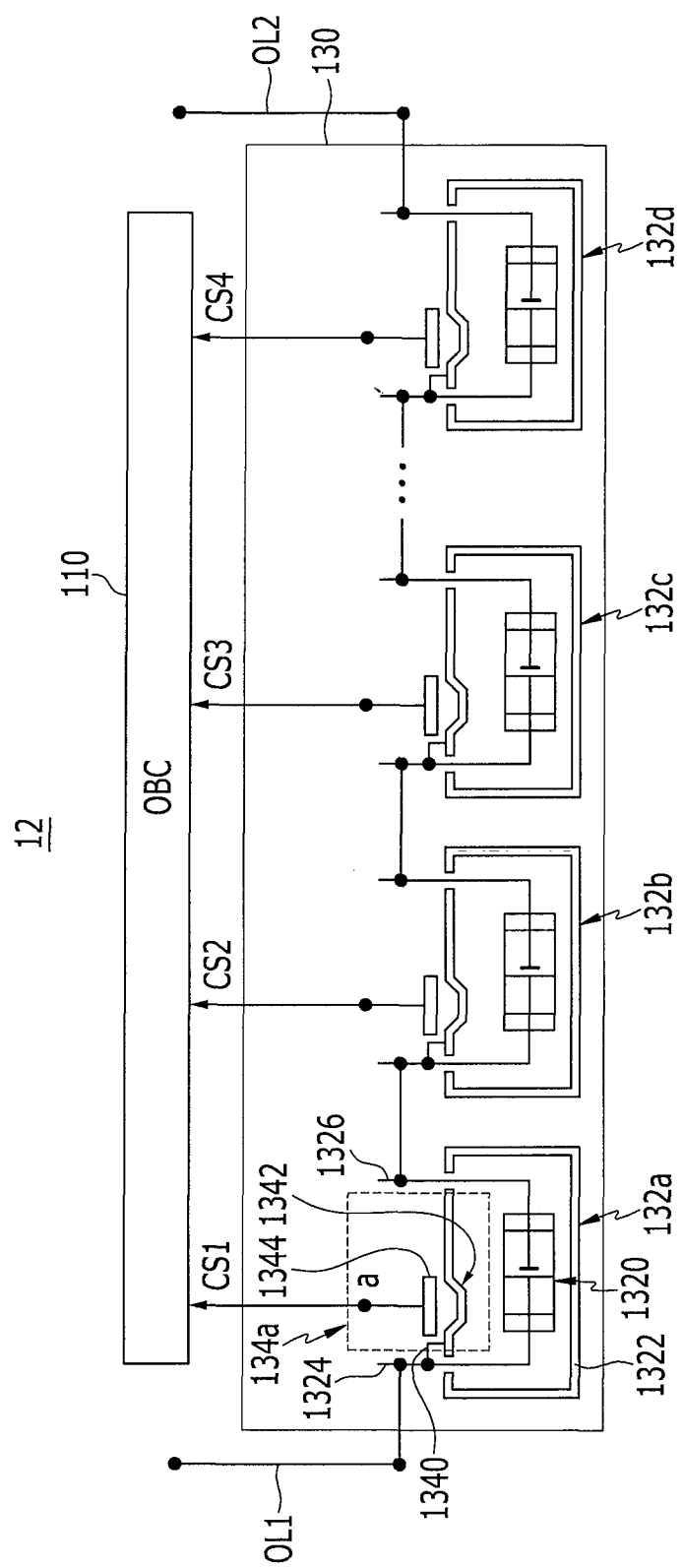
FIG. 3 is a view schematically illustrating a configuration of the rechargeable battery charging apparatus illustrated in FIG. 2 in which connection relationships among battery cells, overcharge preventing units, and an on-board charger (OBC) are illustrated.

FIG. 3 is a view schematically illustrating a configuration of the rechargeable battery charging apparatus 12 illustrated in FIG. 2 in which connection relationships among battery cells 132a to 132d, overcharge preventing units 134a to 134d, and an on-board charger 110 are illustrated.

Referring to FIG. 3, the first to fourth battery cells 132a to 132d are disposed to be spaced from (e.g., spaced apart from) one another by a distance (e.g., a predetermined distance) in one direction. Each of the first to fourth battery cells 132a to 132d according to an exemplary embodiment of the present invention may be formed to have a general structure including an electrode assembly 1320 in which a cathode plate and an anode plate are disposed on respective sides of a separator which is interposed therebetween.

In this embodiment, the first to fourth battery cells 132a to 132d, will be exemplarily described as prismatic lithium ion secondary cells. However, the present invention is not limited thereto and may be applied to various suitable types of cells, such as a lithium polymer cells or cylindrical cells.

The electrode assembly 1320 is installed in a case 1322 and includes a cathode terminal 1324 and an anode terminal 1326 protruding outwardly from the case 1322. The cathode terminal 1324 and the anode terminal 1326 may be formed as bolts with a thread formed on an outer circumferential surface thereof. The case 1322 may be formed of a metal, such as aluminum or stainless steel.

The overcharge preventing unit 134a is disposed on the first battery cell 132a and includes a first short-circuit plate 1342 and a second short-circuit plate 1344. The first short-circuit plate 1342 is formed to have convex shape with respect to the interior of the case 1322, and the convex shape thereof is reversed (e.g., deformed to be reversed) due to internal pressure of the case 1322.

In this embodiment, the first short-circuit plate 1342 is electrically coupled to the cathode terminal 1324 of the first battery cell 132a through a connection tab 1340. The connection tab 1340 may extend from the cathode terminal 1324, and a shape thereof is not limited.

The second short-circuit plate 1344 is disposed to face the first short-circuit plate 1342 and be spaced from (e.g., spaced apart from) the first short-circuit plate 1342. The second short-circuit plate 1344 is electrically coupled to the OBC 110.

Hereinafter, the overcharge preventing unit 134 will be described in further detail with reference to FIGS. 4 and 5.

Figure 4:
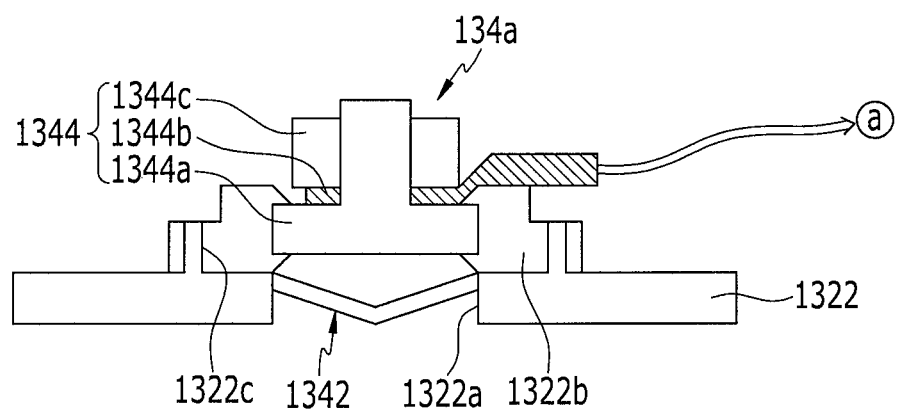
FIG. 4 is a view illustrating a configuration of an overcharge preventing unit according to an exemplary embodiment of the present invention.

FIG. 4 is a view illustrating a configuration of an overcharge preventing unit 134a according to an exemplary embodiment of the present invention. As illustrated in FIG. 4, the overcharge preventing unit 134a includes the first short-circuit plate 1342 and the second short-circuit plate 1344.

The first short-circuit plate 1342 is integrally formed with (e.g., is integral with) the case 1322 and is disposed on (or in) a short-circuit opening 1322a (e.g., a short-circuit hole) in the case 1322.

The second short-circuit plate 1344 is disposed on (e.g., over) the short-circuit opening 1322a of the case 1322 and spaced from the first short-circuit plate 1342. In this embodiment, the second short-circuit plate 1344 includes a bolt 1344a, a ring terminal 1344b, and a nut 1344c.

The bolt 1344a is partially embedded in an insulator 1322b through insert molding so as to be fixed to the case 1322. The insulator 1322b is formed on the case 1322 and includes a through opening (e.g., a through hole) at a position corresponding to the short-circuit opening 13226a.

The case 1322 may include a fixing tab 1322c fixing the insulator 1322b to the case 1322. The bolt 1344a is configured to be physically in contact with the first short-circuit plate 1342 to electrically couple the first short-circuit plate 1342 to the ring terminal 1344b when the convex shape of the first short-circuit plate 1342 is reversed.

The ring terminal 1344b may be coupled to the bolt 1344a and electrically connected to the OBC 110 through a line connected to (e.g., compressively connected to) an end portion thereof. The nut 1344c is coupled to the bolt 1344a and fixes the ring terminal 1344b therebetween.

For example, the first short-circuit plate 1342 is reversed in shape due to internal pressure of the case 1322 so as to be physically brought into contact with the bolt 1344a. The first short-circuit plate 1342 is then electrically coupled to the OBC 110 through the line of the ring terminal 1344b.

Figure 5:
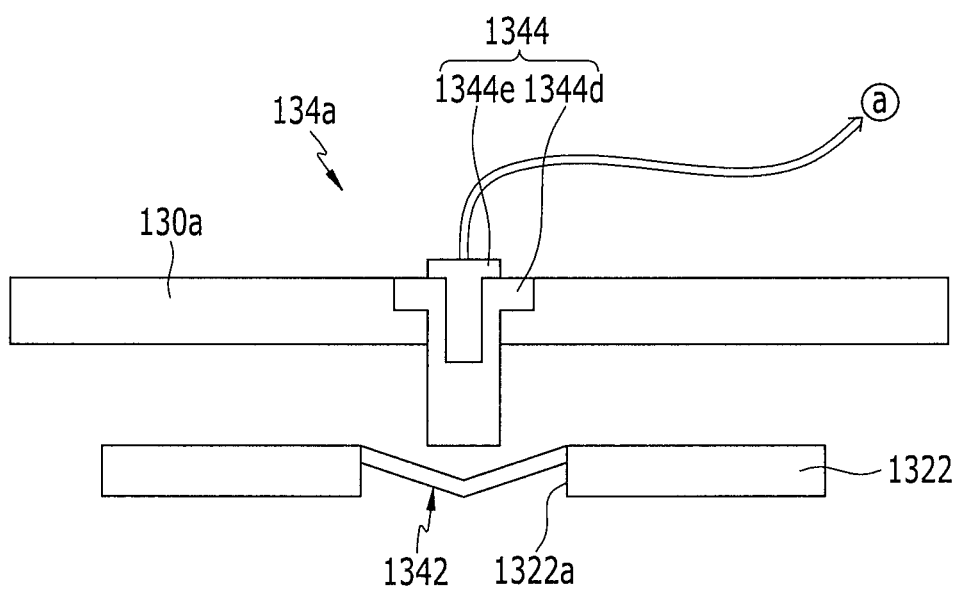
FIG. 5 is a view illustrating a configuration of an overcharge preventing unit according to another exemplary embodiment of the present invention.

FIG. 5 is a view illustrating a configuration of an overcharge preventing unit 134a according to another exemplary embodiment of the present invention. As illustrated in FIG. 5, the overcharge preventing unit 134a includes the first and second short-circuit plates 1342 and 1344. In this embodiment, the first short-circuit plate 1342 has the same or substantially the same configuration as that of the first short-circuit plate 1342 illustrated in FIG. 4, so a detailed description thereof may be omitted.

The second short-circuit plate 1344 is disposed on (e.g., over) the short-circuit opening 1322a in the case 1322 and spaced from the first short-circuit plate 1342. The second short-circuit plate 1344 includes a bolt 1344d and a contact pin 1344e. The bolt 1344d is insertedly fixed to a module case 130a. The module case 130a may include a through opening (e.g., a through hole) in a position corresponding to the short-circuit opening 1322a.

The contact pin 1344e is inserted into the bolt 1344d by press fitting. The contact pin 1344e may include an action pin insertedly fixed to the bolt 1344d mechanically. For example, the contact pin 1344e may be formed from an elastic material and may use its elasticity to be fixed to the bolt 1344d. The contact pin 1344e is electrically coupled to the OBC 110 through a line coupled to (e.g., compressively connected to) an end portion thereof.

For example, the first short-circuit plate 1342 is reversed in shape due to internal pressure of the case 1322 so as to be physically brought into contact with the bolt 1344d. The first short-circuit plate 1342 then acts as a conductive wire electrically coupled to the OBC 110 through the line of the contact pin 1344e.

In this manner, a protecting device for a rechargeable battery according to exemplary embodiments of the present invention may cut off a charge current supplied to a rechargeable battery from a charger in an abnormal situation in which overcharging cannot be prevented only by controlling the battery management system.

In general, a circuit interrupt device (CID) in a battery cell of a battery is configured to stop the charging of the battery by using physical disconnection when a battery cell has a fault due to, for example, overcharging. Alternatively, an overcharge safety device (OSD) forming a conductive wire bypassing a current path may be used to stop the charging of the battery. Thus, the number of components of a unit cell increases and robustness is weak. For example, when an OSD is applied to a unit cell, a large current should be induced to a fuse installed within the unit cell to blow out the fuse, and in this state, a current path should be bypassed, resulting in degradation of performance due to a trade-off between the OSD and the fuse.

Alternatively, when a battery cell has a fault due to, for example, overcharging, a BMS may determine (e.g., sense or measure) overcharging of a battery and provide control to stop the charging of the battery. However, when noise is generated in a battery control signal from the BSM or the BMS itself is faulty, it may be difficult to prevent overcharging of the battery.

In the exemplary embodiments of the present invention, because a conductive wire is formed to apply a cell voltage or a module voltage from a single unit cell within a battery module or a battery pack to the OBC, a design margin of the unit cell and robustness can be improved, and mechanical and structural interference with respect to other systems does not occur.

While this invention has been described in connection with what is presently considered to be practical exemplary embodiments, it is to be understood that the invention is not limited to the disclosed embodiments, and is intended to cover various modifications and equivalent arrangements included within the spirit and scope of the appended claims and their equivalents.

| Description of Some Reference Symbols | |
|---|---|
| 10: vehicle | 12: rechargeable battery charging apparatus |
| 20: EVSE | 110: on-board charger |
| 120: battery management system | 130: battery module |
| 140: inverter | 150: motor |

What is claimed is:

1. A rechargeable battery charging apparatus comprising: a battery module comprising a plurality of unit cells; and a charging unit configured to charge the battery module using power supplied from an external power source, wherein each of the unit cells comprises:
    an overcharge preventing unit configured to deform according to an internal pressure of the corresponding unit cell to electrically couple the corresponding unit cell and the charging unit;
    an electrode assembly comprising a first electrode and a second electrode; and
    a case accommodating the electrode assembly,
wherein the charging unit is configured to stop charging the battery module when the charging unit is electrically coupled to at least one of the plurality of unit cells by the overcharge preventing unit
wherein the overcharge preventing unit comprises:
    a first short-circuit plate integrally formed with the case of at least one unit cell of the plurality of unit cells and electrically coupled to the first electrode of said at least one unit cell, the first short-circuit plate being configured to deform according to an internal pressure of said at least one unit cell acting on the case; and
    a second short-circuit plate spaced from the first short-circuit plate and electrically coupled to the charging unit, and
wherein the first short-circuit plate is configured to physically contact the second short-circuit plate when the first short-circuit plate deforms.

2. The rechargeable battery charging apparatus of claim 1, wherein the second short-circuit plate is insulated from the case and is installed outside of the case.

3. The rechargeable battery charging apparatus of claim 1, wherein, when the charging unit is electrically coupled to the battery module and receives from the battery module an input voltage value which is equal to or greater than a threshold value, the charging unit stops charging the battery module.

4. The rechargeable battery charging apparatus of claim 1, further comprising:
- a battery management system configured to monitor a state of the battery module and to control charging and discharging of the battery module,
- wherein, when the charging unit is electrically coupled to the battery module by the overcharge preventing unit, the charging unit stops charging the battery module without causing intervention on performance of the battery management system.

* * * * *